United States Patent [19]
Millben

[11] 3,925,723
[45] Dec. 9, 1975

[54] SYSTEM FOR SIMULATING SWITCH CONTACT BOUNCE

[75] Inventor: Lawrence A. Millben, Detroit, Mich.

[73] Assignee: Burroughs Corporation, Detroit, Mich.

[22] Filed: Nov. 29, 1974

[21] Appl. No.: 528,436

[52] U.S. Cl. .......................... 324/28 CH; 324/28 R
[51] Int. Cl.² .......................................... G01R 31/02
[58] Field of Search ............ 324/43 R, 28 R, 28 CB, 324/28 CH, 28 CR, 28 RS

[56] References Cited
UNITED STATES PATENTS

| | | | |
|---|---|---|---|
| 3,535,620 | 10/1970 | Johnston | 324/28 R |
| 3,743,927 | 7/1973 | Bridges | 324/28 RS |
| 3,822,398 | 7/1974 | Rovngak | 324/28 CR |

Primary Examiner—R. V. Rolinec
Assistant Examiner—Michael J. Tokar
Attorney, Agent, or Firm—Edwin W. Uren; Charles P. Padgett, Jr.; Paul W. Fish

[57] ABSTRACT

A system for electronically simulating the mechanisms and effects of switch contact bounce. The system employs a first variable oscillator which can be adjusted to achieve any desired switch transfer repetition rate and a second variable oscillator which can be used to randomly or sequentially generate, at any frequency, the high frequency component of contact bounce. A first variable delay multivibrator generates the low frequency component of switch contact bounce attributable to the normally-closed side of the switch; a second variable delay multivibrator sets the time the switch will be in the flight position; and a third variable delay multivibrator generates the low frequency component of contact bounce attributable to the normally-open side of the switch. The system can therefore be utilized as desired by the operator to simulate the mechanisms and effects of switch contact bounce in order to test circuits which have been designed for the purpose of eliminating or suppressing the effects of contact bounce in order to determine their efficiency or reliability.

10 Claims, 8 Drawing Figures

PRIOR ART

SYSTEM FOR SIMULATING SWITCH CONTACT BOUNCE

BACKGROUND OF THE INVENTION

Various types of switches, such as single pole, double throw switches or various types of pushbuttons have been employed in various electronic circuits for producting a single pulse output. While these switches have gained widespread use in the computer industry for numerous applications, they have not been generally employed in applications that require an extremely high degree of reliability. This is due to the fact that most of these switches are subject to a phenomenon known as contact bounce or ringing. When the switch is operated, its contacts forceably strike each other and initially make only an intermittent contact until they ultimately stop bouncing. This bouncing, which usually has both a high and a low frequency noise component, results in ambiguous or spurious output pulses which are not acceptable for applications requiring noise-free output pulses with a high degree of reliability.

The prior art is replete with examples of circuits which have been designed for the ostensible purpose of eliminating contact bounce errors. U.S. Pat. No. 3,471,789 which issued to B. W. Nutting et al. on Oct. 7, 1969 entitled "Single Pulse Switch Logic Circuit" and U.S. Pat. No. 3,508,079 which issued to E. W. Moll et al. on Apr. 21, 1974 entitled "Logic Sensing Circuit With Single Push Button Operation" are but two examples of such circuits.

Once such circuits are designed and built, they must be tested in order to determine whether or not they effectively eliminate contact bounce errors. Any reliable test must take cognizance of the fact that there are two basic mechanisms involved in contact bounce. The first mechanism is a high frequency bounce or "wiping" action. This causes a high frequency burst of electrical energy to be generated. The second mechanism is a low frequency bounce which normally can be quite easily eliminated but is none the less important since it is a part of the contact bounce problem.

There are two basic methods employed in the prior art to test anti-bounce circuits. One is to design a circuit, put a switching mechanism into the circuit and repeatedly transfer the switch. This is a very slow process and if there is a 1 percent failure rate in the circuit, one might have to transfer the switch a hundred times before a single failure is noticed, and even then one will not know just what has failed. If we look at another hundred or so transfers you may get a second chance to observe the failure, etc.

The second method of the prior art is somewhat more sophisticated and employs a motor or similar mechanical contrivance to operate the switch. The observer then watches the switch signals on an oscilloscope and one can more readily observe the failures. If one is not careful, however, the motor will rotate at a speed such that the switch components will not have time to settle, thus causing erroneous information to be presented and the test results will be unreliable. In any event, the only control which the operator has over the testing is that of varying the speed of the motor so as to change the repetition rate at which the switch is opened and closed. None of the other parameters or mechanisms of contact bounce can be varied.

SUMMARY OF THE INVENTNION

It is an object of this invention to provide a system for simulating the mechanisms and effects of switch contact bounce.

It is a further object of this invention to provide a switch contact bounce simulator in which the operator may selectively vary the high frequency and low frequency components of switch contact bounce as well as the repetition rate.

It is yet a further object of this invention to provide a circuit for simulating switch contact bounce wherein the operator has control over the pulse repetition rate by the use of a variable time base and wherein the pulse width may be selectively varied by delay means which simulate flight time and position.

It is still a further object of the present invention to provide a contact bounce simulator wherein the switch transfer repetition rate is selectively variable by a first variable oscillator; wherein a second variable oscillator is used to generate the high frequency component of the switch contact bounce; wherein a first delay multivibrator is used to simulate the time that the switch will be in the flight position; wherein a second delay multivibrator is used to selectively vary the low frequency component for the normally-closed side of the switch; and wherein a third delay multivibrator is used to selectively vary the low frequency component for the normally-open side of the switch.

These and other objects and advantages of the present invention are accomplished in an electrical system for selectively varying the simulated mechanisms and effects of switch contact bounce. A first variable oscillator is used to control the pulse repetition or switch transfer rate and a first variable delay multivibrator is used to generate the low frequency component for the normally-closed side of the switch. A second variable delay multivibrator is used to simulate the time the switch will be in the flight position and a third varaiable delay generates the low frequency component for the normally-open side of the switch. A second variable oscillator generates the high frequency component of switch contact bounce. Means are provided for adjusting the system for synchronous or asynchronous operation and the signals generated by the circuit will insure that anti-bounce circuits can be adequately and accurately tested with a degree of reliability never before achieved in the prior art.

BRIEF DESCRIPTION OF THE DRAWINGS

Other objects, advantages and features of this invention will become more fully apparent from the following detailed description, appended claims and accompanying drawings in which like reference numerals designate corresponding parts:

DETAILED DESCRIPTION OF THE INVENTION

Figure 1:
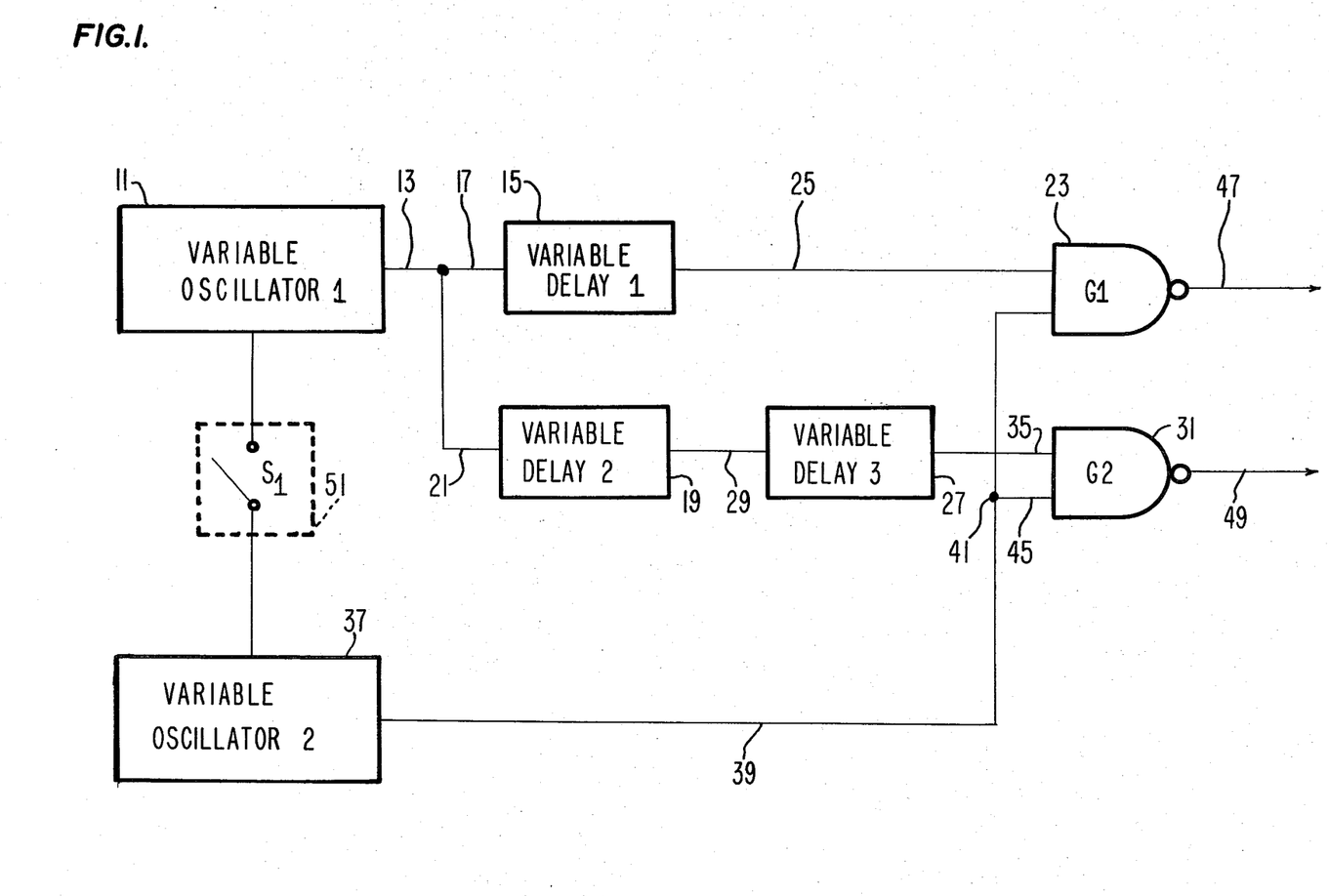
FIG. 1 shows a block diagram of the system for simulating the mechanisms and effects of switch contact bounce of the present invention.

FIG. 1 illustrates a block diagram of the contact bounce simulator of the present invention. A first variable oscillator 11 has its output 13 connected to the input of a first variable delay multivibrator 15 via lead 17 and to the input of a second variable delay 19 via lead 21. The output of the first variable delay 15 is supplied to a first input of a NAND gate 23 via lead 25 and the output of the second variable delay multivibrator 19 is supplied to the input of a third variable delay multivibrator 27 via lead 29. The output of the third variable delay multivibrator 27 is supplied to a first input of a NAND gate 31 via lead 35. A second variable oscillator 37 has its output connected via lead 39 to a node 41. Node 41 is connected via lead 43 to the second input of NAND gate 23 and via lead 45 to the second input of NAND gate 31. The output of NAND gate 23 is taken via output lead 47 and the output of NAND gate 31 is taken via output lead 49. The first variable oscillator 11 may be coupled to the second variable oscillator 37 via a switching means 51 which can be opened for asynchronous operation and closed to synchronize the operation of the two variable oscillators.

Figure 2:
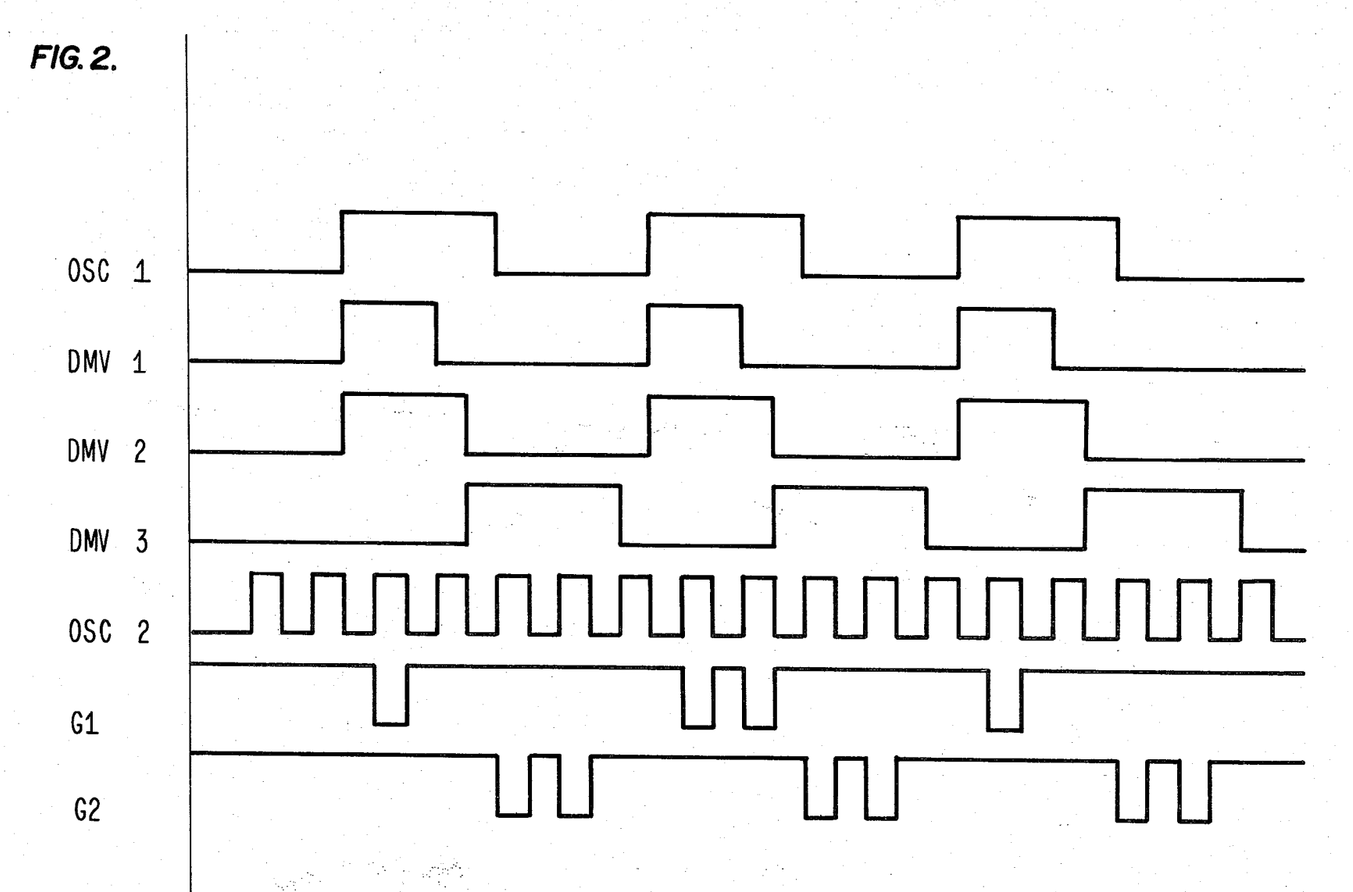
FIG. 2 illustrates a timing diagram which may aid in the understanding of the operation of the system of FIG. 1.

FIG. 2 is a timing diagram of the circuit of FIG. 1 and shows the output of each of the blocks of FIG. 1 including the first variable oscillator 11, the first variable delay multivibrator 15, the second variable delay multivibrator 19, the third variable dalay multivibrator 27, the second variable oscillator 37, the first NAND gate 23, and the second NAND gate 31.

It will be observed that the first line of the timing diagram, which is labeled OSC NO. 1, shows a train of pulses representing the switch transfer rate of the system. The frequency can be increased or decreased, as known in the art, since the first oscillator 11 is variable.

The second line is labeled DMV No. 1 and represents the low frequency component of contact bounce attributable to the normally-closed side of a single-pole doubled throw switch. The output of DMV NO. 1 is triggered by the arrival of a high input from the output of the first variable oscillator. The width of the pulse which is taken from the output of the first delay multivibrator may be varied, as known in the art, to represent different low frequency components.

The third line is labeled DMV No. 2 and represents the flight time of the switch. The pulse goes high upon the arrival of a high signal from the output of the first variable oscillator and its duration or width may be varied to represent different flight times.

The fourth line is labeled DMV No. 3 and represents the low frequency component of contact bounce attributable to the normally-open side of a single-pole, double throw switch. The output of DMV No. 3 goes high upon the arrival of a high signal at its input from the output of the second delay multivibrator. The width of the output pulse can be varied to represent different low frequency components.

The fifth line of the timing diagram shows a train of pulses which represent the high frequency component of contact bounce. The frequency of these pulses can be increased or decreased, as known in the art.

The sixth line of the timing diagram shows the output of NAND gate 23 and is labeled G1. It will be seen that the gate will pass a low pulse for each of the output pulses of the second variable oscillator 37 which occurs while the gate is enabled by a high output from the first delay multivibrator 15.

The seventh line of the timing diagram of FIG. 2 shows the output of NAND gate 31 and is labeled G2. It will be seen that this gate will pass a negative-going pulse for each positive output pulse from the second variable oscillator 37 which occurs while the gate is enabled by the presence of a high output from the third delay multivibrator 27.

The function of the various blocks of FIG. 1 will now be generally described. The first variable oscillator 11 may be controlled by the operator to adjust the pulse repetition rate and therefore the simulated switch transfer repetition rate. The output of the first variable oscillator 11 serves as an activating input to the first variable delay 15 and as an activating input to the second variable delay 19. The first variable delay multivibrator 15 generates the low frequency component for the normally-closed side of the switch and the second variable delay multivibrator 19 sets the time which the contacts will be in the flight position. The output of the second variable delay multivibrator 19 serves to activate the third variable delay multivibrator 27. The third variable delay multivibrator 27 generates the low frequency component for the normally-open side of the switch. The second variable oscillator 37 generates the high frequency component of contact bounce. The output of the second variable oscillator 37 is gated through NAND gate 23 and the NAND gate 23 is enabled by the presence of a pulse from variable delay multivibrator 15, representing the low frequency component for the normally-closed side of the switch, and is gated through NAND gate 31 when NAND gate 31 is enabled by the presence of a pulse from the output of the third variable delay multivibrator 27 which signifies the low frequency component for the normally-open side of the switch. A switch S1 is contained in the switching means 51 and can be closed to provide for the synchronous operation of the first and second variable oscillators 11 and 37 or opened to provide for asynchronous operation.

From a study of FIGS. 1 and 2, it will be observed that the circuit is designed so that the operator has control over each of the mechanisms of switch contact bounce. The switch transfer repetition rate may be controlled by selectively varying the pulse repetition rate of the first variable oscillator 11. The output of the variable oscillator 11 controls the activation of the variable delay multivibrators 15 and 19 and hence the enablement or disablement of NAND gates 23 and 31. The high frequency bounce mechanism can be generated at random or sequentially by controlling the positioning of switch 51 and at any frequency by varying the pulse repetition rate of the second variable oscillator 37. The low frequency bounce mechanism can be simulated with a variable pulse length and/or frequency by selectively varying the pulse width or duration in variable delay multivibrators 15, 19 and 27.

Since the switch makes contact in one direction and then goes into the flight position before it again makes contact in the other direction, it is necessary to provide a delay to simulate the flight time or position of the switch. The amount of flight delay corresponds to the amount of time the switch is in the flight position and the amount of this delay is controlled by varying the pulse width of the second variable delay multivibrator 19. After the flight delay, the reverse transfer takes place but it is not the intention of the present invention to precisely generate a complete switching sequence. Since the low frequency mechanism has a component for the normally-closed side of the switch and a second component for the normally-open side of the switch, variable delay multivibrator 15 can be set to control the first low frequency component and the third variable delay multivibrator 27 can be adjusted to provide for the second low frequency component. In summary, it will be readily observed that all of the mechanisms and effects of switch contact bounce can be simulated and varied as the operator sees fit. In this manner, the circuit being tested can be put through a comprehensive and exhaustive testing to determine whether or not it is subject to contact bounce errors.

Figure 3:
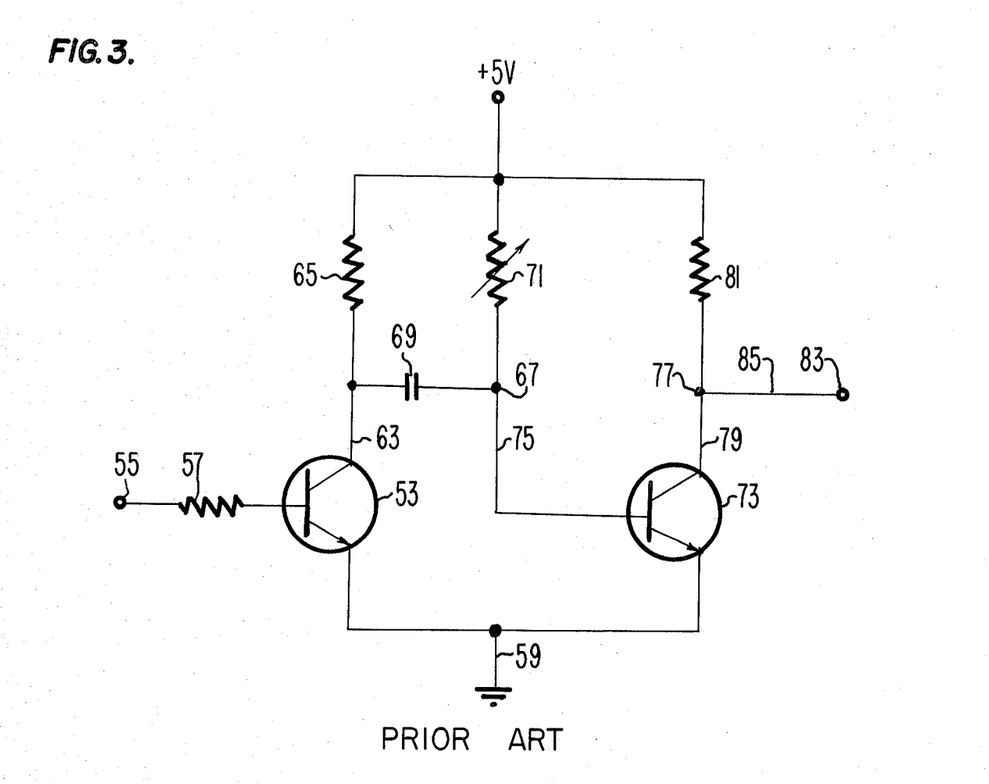
FIG. 3 is a schematic diagram of a standard delay multivibrator such as used in block 15 of FIG. 1.

Variable oscillators 11 and 37 are standard, commercially-available variable oscillators and the NAND gates 23 and 31 are likewise standard commercially-available models. FIG. 3 represents a relatively standard delay multivibrator such as that used for variable delay multivibrator 15. A first transistor 53 has its base connected to an input 55 through resistor 57 and its emitter coupled to ground through lead 59. The collector of transistor 53 is coupled to node 61 via lead 63. Node 61 is coupled to a +5 volt source of potential through resistor 65 and to node 67 via a capacitor 69. Node 67 is coupled to the +5 volt source of potential through a variable resistor 71 and is coupled to the base of a second transistor 73 via lead 75. The emitter of transistor 73 is coupled to ground through lead 59 and the collector is coupled to a node 77 through lead 79. Node 77 is coupled to the +5 volt source of potential through resistor 81 and to the variable delay multivibrator output 83 via lead 85.

Figure 4:
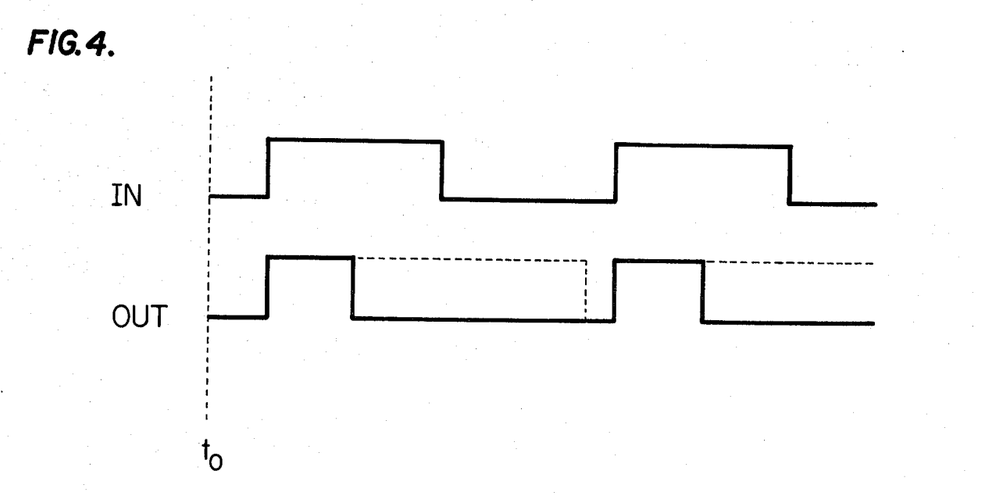
FIG. 4 illustrates a timing diagram which may aid in the understanding of the operation of the circuit of FIG. 3.

The operation of the delay circuit of FIG. 3 can be understood by observing the timing diagram of FIG. 4 which shows the input signal which is applied to input 55 and the variable pulse-width output which is taken from output 83. The dotted portion of the pulse on the line labeled "out" illustrates that the duration or width of the pulse may be varied by changing the resistance of the variable resistor 71 and hence the RC time constant of the circuit. Since the output comprises a variable pulse length pulse, the resistance 71 can be varied by the operator to vary the low frequency component attributable to the normally-closed side of the switch.

Figure 5:
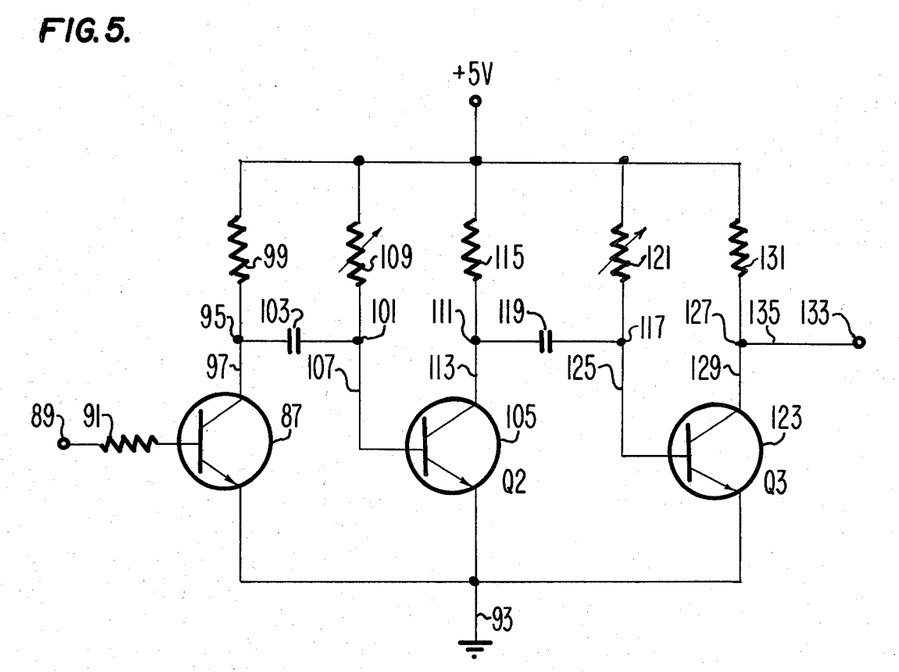
FIG. 5 is a schematic diagram of the delay multivibrator used in blocks 19 and 27 of the system of FIG. 1.

The circuit of FIG. 5 represents a schematic diagram of the second and third variable delay multivibrators of blocks 19 and 27, respectively. The circuit comprises a first transistor 87 having its base coupled to a circuit input 89 through a resistor 91. The emitter of transistor 87 is coupled to ground via lead 93 and the collector is coupled to a node 95 via lead 97. Node 95 is coupled to a +5 volt source of potential through a resistor 99 and to a node 101 via capacitor 103. Node 101 is coupled to the base of a transistor 105 via lead 107 and to the +5 volt source of potential through a variable resistor 109. The emitter of transistor 105 is coupled to ground via lead 93 and the collector is coupled to an output node 111 through a lead 113. Node 111, which represents the output of the second delay multivibrator 19, is coupled to the +5 volt source of potential through a resistor 115 and to node 117 via capacitor 119. Node 117 is coupled to the +5 volt source of potential through a variable resistor 121 and to the base of a third transistor 123 via lead 125. The emitter of transistor 123 is coupled to ground through lead 93 and the collector is coupled to an output node 127 via lead 129. Output node 127, which represents the output of the third delay multivibrator 27, is coupled to the +5 volt source of potential through a resistor 131 and to the delay output terminal 133 via lead 135.

Figure 6:
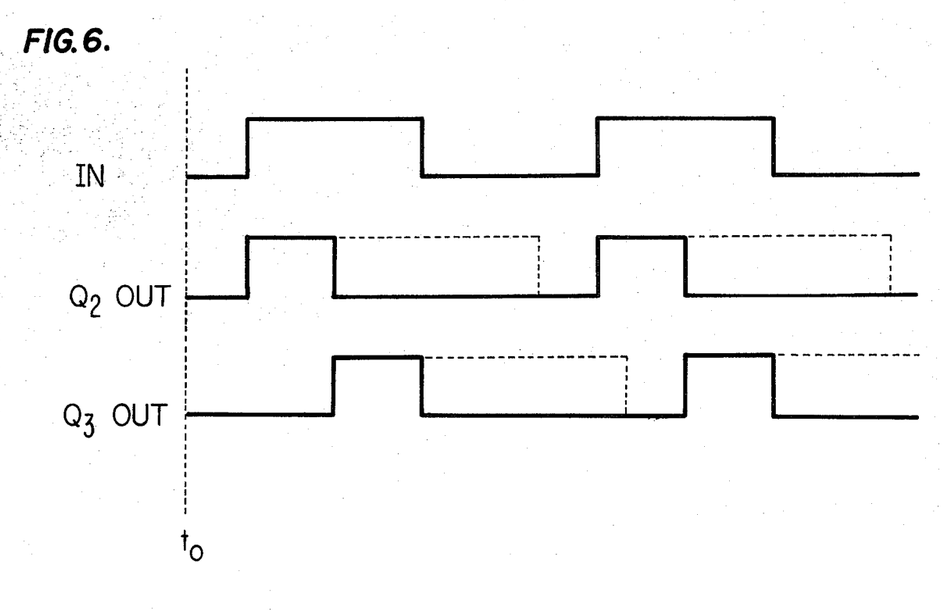
FIG. 6 illustrates a timing diagram for the operation of the circuit of FIG. 5.

FIG. 6 is a timing diagram which illustrates the operation of the circuit of FIG. 5. The input which is supplied to input terminal 89 is depicted by the pulse train labeled IN. The pulse train labeled "Q2 OUT" represents the output signal of the second variable delay multivibrator 19 which is taken from output node 111 of the circuit of FIG. 5 and the pulse train Q3 OUT represents the output of the third variable delay multivibrator 27 which is taken from output terminal 133 of the circuit of FIG. 5. The dotted portion of the pulse which is shown on the pulse train labeled Q2 OUT indicated that the width of the pulses may be varied by changing the resistance of variable resistor 109 and hence the RC time constant of the second delay multivibrator 19 and the dotted portion of the pulses on the line labeled Q3 OUT indicates that the width of the output pulses may be varied by changing the resistance of variable resistor 121 and hence the RC time constant of the third delay multivibrator. The timing diagram of FIG. 6 shows that the output of the second DMV goes high as soon as the output of the first variable oscillator goes high and it is seen that the width of the output pulse from the second DMV can be varied. It will also be seen that the output of the third DMV will go high on the trailing edge of the high output pulse from the second DMV. The leading edge of the pulses on line three will, therefore, always correspond to the trailing edge of the pulses on line two of the timing diagram of FIG. 6. As mentioned above, the width of the pulses on line three may be selectively varied.

The system of the present invention for simulating switch contact bounce will provide a highly reliable simulation of a switch contact bounce signal which can be used to test circuits for their susceptibility to contact bounce errors or for the purpose of testing circuits that were designed specifically for the purpose of eliminating or suppressing the effects of contact bounce. The circuit enables the operator to vary both the high frequency component of switch contact bounce and the low frequency component of switch contact bounce as he desires. As to the low frequency component of switch contact bounce, the system of the present invention enables the operator to vary the low frequency component attributable to the normally-closed side of the switch, the low frequency component attributable to the normally-open side of the switch, and the time which the switch is in the flight position. With all of these controls available to the operator, he can tailor the contact bounce mechanism to whatever he desires, thus affording the designer with the meriad of options heretofore unavailable in the art. The degree and sophistication of control available to the operator insures the accuracy of the simulated signal and enables the operator to conduct tests much more rapidly and with more reliable and conclusive results than was heretofore possible in the prior art.

Figure 7:
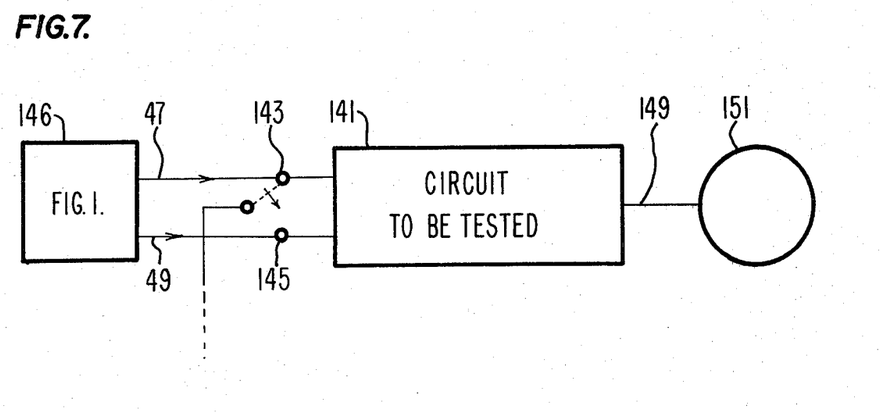
FIG. 7 shows a block diagram depicting the use of the system of FIG. 1 in testing a circuit designed for use with a single-pole, double throw switch.

FIG. 7 illustrates a method of testing whereby the contact bounce simulator system of the present invention is used to test a circuit which would normally be used with a single-pole, double throw switch. The circuit to be tested is represented by the dotted block 141. A first test input to block 141 is labeled 143 and corresponds to the input which, in operation, would be coupled to the normally-closed contact of a single-pole, double throw switch. A second test input to block 141 is labeled 145 and corresponds to the input which, under operating conditions, would be coupled to the normally-open contact of a single-pole, double throw switch. A switch member 147 is shown by dotted lines since it is not actually present in the circuit or in the testing system but would be present in the environment in which the circuit to be tested 141 is ultimately utilized. The normally-closed contact 143 is coupled to output lead 47 of the system of FIG. 1 which is represented by block 146. The second test input terminal 145 is connected to the output lead 49 of the system of FIG. 1 (block 146). The output 149 of the circuit to be tested 141 is connected to an oscilloscope 151 or other test measurement apparatus and the effects of the simulated contact bounce signal on the circuit being tested can be studied and analyzed. As indicated previously, the various facets of the contact bounce mechanism may be dynamically varied and the effect on the circuit to be tested may be studied for all possible variations.

Figure 8:
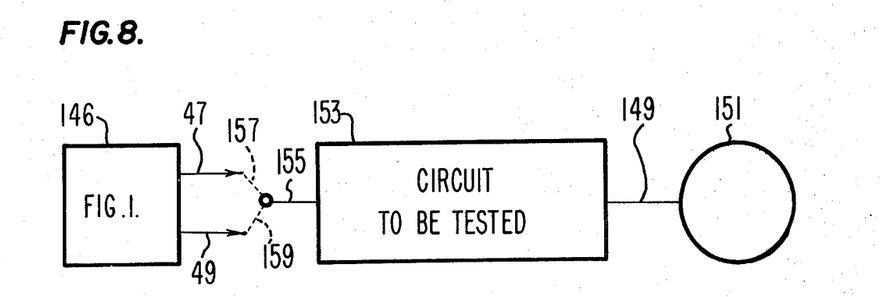
FIG. 8 shows a block diagram depicting the use of the system of FIG. 1 in testing a circuit designed for use with a single switch contact.

FIG. 8 represents a method of testing a circuit which would normally be used with a single-pole, single throw switch. The circuit to be tested is illustrated by the dotted block 153 and a first test input to circuit 153 is labeled test input 155. Test input 155 represents the point at which the circuit is coupled to a switch under operating conditions. The system of FIG. 1 is represented by the block labeled 146 and the first test signal output 147 and the second test signal output 49 are shown. If the circuit to be tested, is to be tested for its susceptibility to the components of contact bounce attributable to a normally-closed switch contact, then the first test output 47 is connected to the circuit input 155 via the lead 157 which is shown as a dotted line. If, however, the circuit is to be tested for its susceptability to the components of contact bounce attributable to a normally-open switch contact, then the second test signal output 49 is connected to the circuit input 155 via dotted lead 159. By either method, the testing is easier and faster and the results are more accurate and conclusive.

Although specific apparatus has been shown for the purpose of describing applicant's invention, it will be apparent to those skilled in the art that other variations and modifications in the specific structure illustrated may be made without departing from the spirit and scope of the present invention which is limited only by the appended claims.

What is claimed is:

1. A system for electronically simulating the mechanisms of switch contact bounce comprising:
   first variable oscillator means for determining the switch transfer rate of the system;
   first delay multivibrator means responsive to said first variable oscillator means for generating the low frequency component of contact bounce attributable to a normally-closed side of a switch;
   second delay multivibrator means responsive to said first variable oscillator means for determining the time of the flight of said switch;
   third delay multivibrator means responsive to the output of said second delay multivibrator means for generating the low frequency component of contact bounce attributable to the normally-open side of a switch;
   second variable oscillator means for generating the high frequency component of contact bounce; and
   output gating means coupled to said first delay multivibrator means, said third delay multivibrator means and said second variable oscillator means for gating an electrical output signal which simulates the mechanisms of switch contact bounce.

2. The simulation system of claim 1 wherein said first delay multivibrator means includes a variable resistor means for selectively varying the width of the output pulse of said first delay multivibrator means and hence the low frequency component of contact bounce attributable to the normally-closed side of a switch; wherein said second delay multivibrator means includes a variable resistor means for selectively varying the width of the output pulse of said second delay multivibrator means and hence the time of flight of said switch; and wherein said third variable delay multivibrator means includes a variable resistor means for selectively varying the width of the output pulse of said third delay multivibrator means and hence the low frequency component of contact bounce attributable to the normally-open side of a switch.

3. The simulator system of claim 1 wherein said output gating means comprises:
   a first NAND gate means having a first input coupled to the output of said first delay multivibrator means and a second input coupled to the output of said second variable oscillator means for gating a first test signal having both the high and the low frequency components of contact bounce attributable to the normally-closed side of a switch; and
   a second NAND gate means having a first input coupled to the output of said third delay multivibrator means and a second input coupled to the output of said second variable oscillator means for gating a second test signal having both the high and the low frequency components of contact bounce attributable to the normally-open side of a switch.

4. The system for electronically simulating the mechanisms of switch contact bounce as set forth in claim 1, said system further including means for selectively coupling the second variable oscillator means to the first variable oscillator means for synchronous operation therewith and for selectively decoupling the second variable oscillator means from the first variable oscillator means for asynchronous operation.

5. The simulation system of claim 1 wherein said second and third delay multivibrator means comprises:
   a first transistor means having its base coupled to the output of said first variable oscillator means and its emitter coupled to ground;
   a second transistor means having its emitter coupled to ground and its collector serving as a first output means;
   capacitive means for coupling the base of said second transistor means to the collector of said first transistor means;
   resistive means coupling said capacitive means to a source of potential, said resistive means including a variable resistive means for selectively varying the width of the output pulses at said first output means by varying the RC time constant of said resistive means and said capacitive means;
   a third transistor means having its emitter coupled to ground and its collector serving as a second output means;

second capacitive means for coupling the collector of said second transistor means to the base of said third transistor means; and said resistive means coupling said second capacitive means to a source of potential, said second resistive means including a second variable resistive means for selectively varying the width of the output pulses at said second output means by varying the RC time constant of said second resistive means and said second capacitive means.

6. A system for electronically generating test signals simulating the mechanisms of switch contact bounce normally associated with a single-pole, double throw switch comprising:

a first variable oscillator means for varying the switch transfer rate of the system;

a second variable oscillator means for generating the high frequency component of contact bounce;

multivibrator means responsive to the output of said first variable oscillator means for generating the low frequency component of contact bounce; and output gating means coupled to said multivibrator means and to said second variable oscillator means for passing test signals simulating the mechanisms of switch contact bounce normally associated with a single-pole, double throw switch.

7. The test signal generating system of claim 6 wherein said multivibrator means comprises:

a first variable delay multivibrator means having an input coupled to the output of said first variable oscillator means and its output coupled to said gating means, said first variable delay multivibrator means including a variable resistive means for selectively varying the RC time constant of said first variable delay multivibrator means for varying the low frequency component of contact bounce attributable to the normally-closed switch contact;

second variable delay multivibrator means having an input coupled to the output of said first variable oscillator means and including a variable resistive means for selectively varying the RC time constant of said second variable delay multivibrator means for varying the time of flight of said single-pole, double throw switch; and third variable delay multivibrator means having an input coupled to the output of said second variable delay multivibrator means and an output coupled to said gating means, said third variable delay multivibrator means including a variable resistive means for altering the RC time constant of said third variable delay multivibrator means for varying the low frequency component of contact bounce attributable to the normally-open switch contact.

8. The test signal generating system of claim 7 wherein said output gating means comprises:

a first NAND gate means having a first input coupled to the output of said first variable delay multivibrator means and a second input coupled to the output of said second variable oscillator means for gating a first test signal simulating both the high frequency and the low frequency components of switch contact bounce attributable to the normally-closed switch contact; and second NAND gate means having first input coupled to the output of said third variable delay multivibrator means and a second input coupled to the output of said second variable oscillator means for gating a second test signal simulating both the high and the low frequency components of switch contact bounce attributable to the normally-open switch contact.

9. A method for testing an electronic circuit for the effects of switch contact bounce, said circuit to be tested having one input which can be operably coupled to the normally-closed side of a single-pole, double throw switch and a second input which can be operably coupled to the normally-open side of a single-pole, double throw switch, said method comprising the steps of:

determining a switch transfer rate;

generating the low frequency component of contact bounce attributable to the normally-closed side of a single-pole, double throw switch;

selecting a switch flight time;

generating the low frequency component of contact bounce attributable to the normally-open side of a single-pole, double throw switch;

generating the high frequency component of contact bounce;

gating said generated components of contact bounce to produce a first test signal having both a low frequency component and a high frequency component attributable to the normally-closed side of a single-pole, double throw switch and a second test signal having both a low frequency component and a high frequency component attributable to the normally-open side of the single-pole, double throw switch;

supplying said first test signal to the first input of said circuit to be tested;

supplying said second test signal to the second input of said circuit to be tested; and monitoring the output of said circuit to be tested to observe the effects of switch contact bounce on the circuit.

10. A method for testing an electronic anti-bounce circuit for the results of switch contact bounce, said circuit to be tested having an input which may be associated with a simple switch and a circuit output, said method comprising the steps of:

determining a switch transfer rate;

generating the low frequency component of contact bounce attributable to the normally-open contact of a simple switch;

selecting a switch flight time;

generating the low frequency component of contact bounce attributable to a normally-open contact of a simple switch;

generating the high frequency component of contact bounce;

gating said generated components of contact bounce to produce a first test signal having both the high frequency component of contact bounce and the low frequency component of contact bounce attributable to the normally-closed contact of a simple switch and to produce a second test signal having both a low frequency component of contact bounce and a high frequency component of contact bounce attributable to a normally-open contact of a simple switch;

supplying said first test signal to the input of said circuit to be tested if said circuit to be tested has been designed for use with the normally-closed contact of a simple switch;

supplying said second test signal to the input of said circuit to be tested if said circuit to be tested has been designed for use with a normally-open contact of a simple switch; and monitoring the output of said circuit to be tested to observe the effects of switch contact bounce on said circuit.

* * * * *